United States Patent
Narita

(10) Patent No.: US 11,790,063 B2
(45) Date of Patent: Oct. 17, 2023

(54) INFORMATION PROCESSING APPARATUS, CONTROL METHOD, AND MEDIUM

(71) Applicant: CANON KABUSHIKI KAISHA, Tokyo (JP)

(72) Inventor: Yuki Narita, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 655 days.

(21) Appl. No.: 17/011,262

(22) Filed: Sep. 3, 2020

(65) Prior Publication Data

US 2021/0073366 A1 Mar. 11, 2021

(30) Foreign Application Priority Data

Sep. 9, 2019 (JP) .................. 2019-163844

(51) Int. Cl.
*G06F 21/00* (2013.01)
*G06F 21/32* (2013.01)
*H04N 1/00* (2006.01)
*H04N 1/44* (2006.01)
*G06V 40/16* (2022.01)

(52) U.S. Cl.
CPC ......... *G06F 21/32* (2013.01); *H04N 1/00395* (2013.01); *H04N 1/00514* (2013.01); *G06V 40/173* (2022.01); *H04N 1/442* (2013.01)

(58) Field of Classification Search
CPC ... G06F 21/32; G06F 21/608; H04N 1/00395; H04N 1/00514; H04N 1/442; G06V 40/173; G06V 40/172
See application file for complete search history.

(56) References Cited

U.S. PATENT DOCUMENTS

| | | | | |
|---|---|---|---|---|
| 8,037,521 | B2* | 10/2011 | Minato | H04N 1/00472 726/16 |
| 9,906,674 | B2 | 2/2018 | Nishii | |
| 2010/0115608 | A1* | 5/2010 | Uchikawa | G06F 21/31 726/18 |
| 2015/0043790 | A1 | 2/2015 | Ono | |
| 2015/0062612 | A1* | 3/2015 | Nishii | H04N 1/4433 358/1.14 |
| 2016/0094756 | A1* | 3/2016 | Onishi | H04N 1/0097 358/1.14 |
| 2018/0121144 | A1* | 5/2018 | Hikosaka | G06F 3/1238 |
| 2018/0183961 | A1* | 6/2018 | Kashiwagi | G06Q 30/0283 |
| 2019/0075460 | A1* | 3/2019 | Sakamoto | H04L 63/104 |

FOREIGN PATENT DOCUMENTS

JP 2015035178 A 2/2015
JP 2015045916 A 3/2015

* cited by examiner

*Primary Examiner* — Brandon Hoffman
*Assistant Examiner* — William A Corum, Jr.
(74) *Attorney, Agent, or Firm* — ROSSI, KIMMS & McDOWELL LLP

(57) ABSTRACT

An information processing apparatus is provided. The apparatus performs operations comprising performing facial authentication of a second user in a state in which a first user is logged in, performing authentication of a user using a second scheme that is different from facial authentication if the facial authentication is successful, and switching a logged-in user from the first user to the second user if the authentication using the second scheme is successful and the authenticated user is the second user.

11 Claims, 8 Drawing Sheets

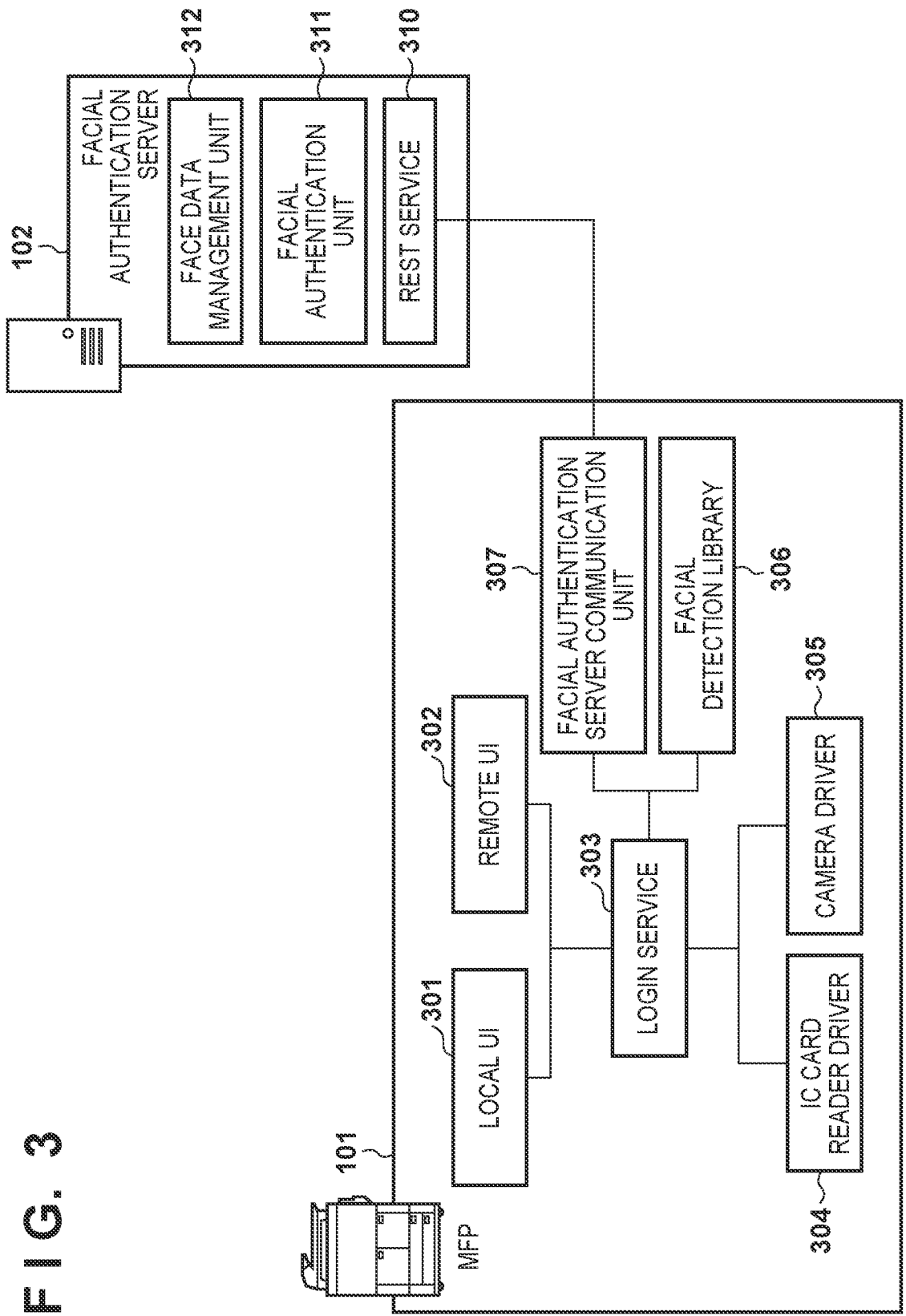

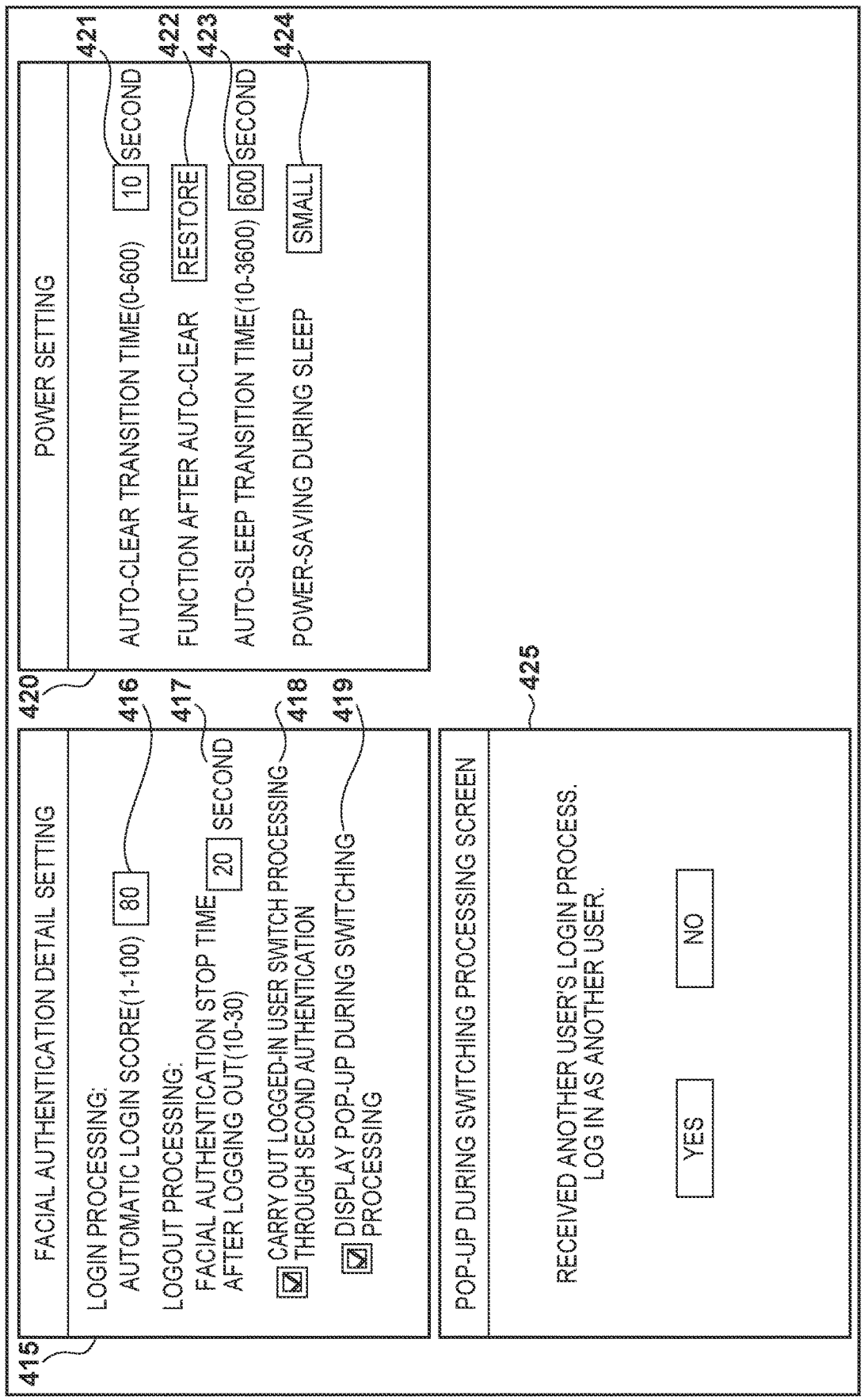

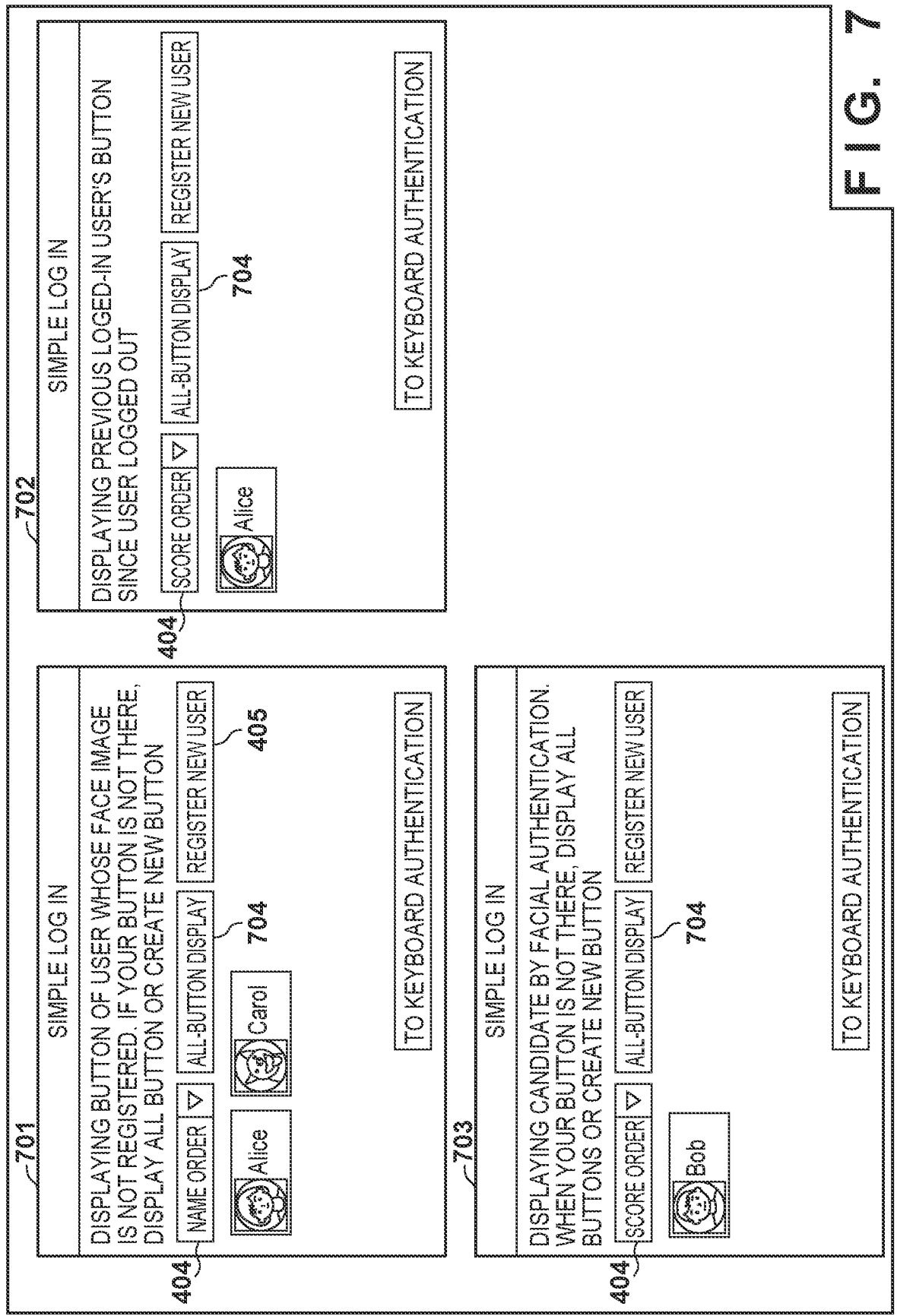

US 11,790,063 B2

INFORMATION PROCESSING APPARATUS, CONTROL METHOD, AND MEDIUM

BACKGROUND OF THE INVENTION

Field of the Invention

The present invention relates to an information processing apparatus including a facial authentication login function, a control method, and a medium.

Description of the Related Art

An information processing apparatus including a facial authentication login function is known (see Japanese Patent Laid-Open No. 2015-35178). Also, regarding a method for logging out after facial authentication has been carried out, a method has been proposed in which a logged-in user is tracked using a camera or the like connected to an information processing apparatus, and the user is logged out when the user moves away (see Japanese Patent Laid-Open No. 2015-45916).

Examples of logout processing through facial authentication include the method of logging out the user when the user moves away as in Japanese Patent Laid-Open No. 2015-45916, and a method of carrying out facial authentication processing upon the elapse of a certain amount of time after a logout button has been pressed. In these cases, when another user is to carry out facial authentication and use the information processing apparatus, even if the previous user has ended use of the apparatus, the next user cannot log in immediately, and thus productivity of the information processing apparatus has been reduced.

SUMMARY OF THE INVENTION

The present invention provides an information processing apparatus that realizes smooth transition of users and improves usability while using facial authentication.

The present invention has the following configurations.

An aspect of the present invention provides an information processing apparatus comprising: at least one processor; and at least one memory, wherein the memory stores a program, and when the processor executes the program, the processor performs operations comprising performing facial authentication of a second user in a state in which a first user is logged in, performing authentication of a user using a second scheme that is different from facial authentication if the facial authentication is successful, and switching a logged-in user from the first user to the second user if the authentication using the second scheme is successful and the authenticated user is the second user.

According to the present invention, it is possible to provide an information processing apparatus that realizes smooth transition of users and improves usability while using facial authentication.

Further features of the present invention will become apparent from the following description of exemplary embodiments with reference to the attached drawings.

BRIEF DESCRIPTION OF THE DRAWINGS

FIG. 3 is a diagram showing a software configuration of a system.
FIGS. 4A-1 and 4A-2 show an example of a user interface displayed on an operation unit of the MFP 101.
FIG. 4B is a diagram showing an example of a user interface displayed on an operation unit of the MFP 101.
FIG. 7 is a diagram showing an example of a user interface that is displayed when logout processing is performed using the procedure shown in FIG. 6.

DESCRIPTION OF THE EMBODIMENTS

Figure 1:
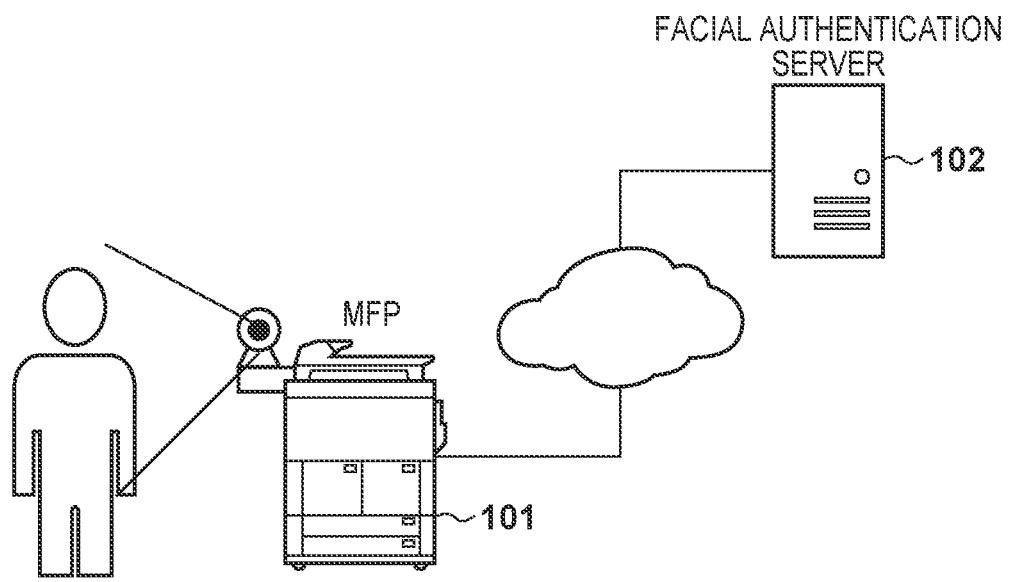
FIG. 1 is a diagram showing a system configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 is a configurational diagram showing an image forming system (also referred to as a facial authentication system) including an image forming apparatus to which the present invention is applied. The MFP 101 is an MFP (Multifunction Peripheral) and is an information processing apparatus to which the invention of the present embodiment has been applied. The MFP 101 captures an image of a user who approaches the MFP 101 using a camera unit, and carries out facial authentication. If the result of facial authentication satisfies a specific condition for allowing login of the user, the MFP 101 automatically logs in the user. If the condition for automatic login is not satisfied based on facial authentication, a simple login function using the facial authentication result is provided to the user as alternative login function. Note that the simple login function includes a function of performing user registration based on a user name of a printing job when the MFP 101 receives the job, and a function of displaying an object corresponding to the registered user (e.g., a button) on a screen, allowing the user to select their own button, and logging in the user. In the present embodiment, registration of face data to be used in facial authentication is further combined with these simple login functions, and this will be described in detail later with reference to FIGS. 5, 9, and the like, for example.

A facial authentication server 102 receives face data from a source requesting authentication, carries out facial authentication, and returns the authentication result (identifier and score of candidate) to the source requesting authentication. The face data is the captured face image itself, or feature data obtained by extracting feature amounts of a face image from a face image using an existing technique. Facial authentication is performed by evaluating the degree of similarity between feature data of a face image of a registered user that is stored in a facial authentication server 102, and feature data of a face image received from a request source. Then, using a user who has obtained a score exceeding a certain standard value as a candidate, the ID of that user, the score, and the like are returned to the request source. The MFP 101 and the facial authentication server 102 are connected to each other via a LAN or the Internet. In the present embodiment, it is assumed that the facial authentication server 102 is a service that is constructed as a virtual server on a cloud, but it may also be a server set on the Internet, or the facial authentication function may also be incorporated in the MFP 101. Note that although the facial authentication login function refers to a function of performing facial authentication to allow login, it is also simply called a "facial authentication function" in some cases.

Hardware Configuration of MFP

Figure 2:
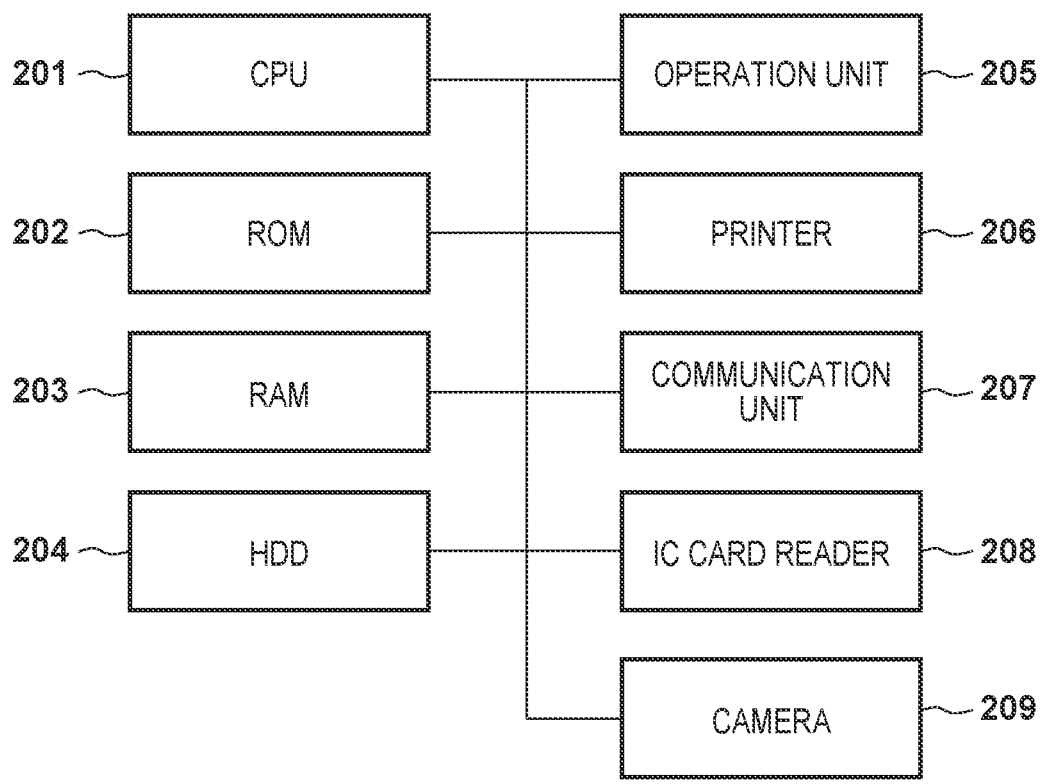
FIG. 2 is a diagram showing a hardware configuration of an MFP 101.

FIG. 2 is a simplified diagram showing a hardware configuration of the MFP 101. A CPU 201 is a central processing unit (processor) that performs overall control of the operations of the MFP 101. A RAM (Random Access Memory) 203 is a volatile memory, and is used as a temporary storage region for expanding various control programs stored in a ROM 202 and an HDD 204.

The ROM 202 is a non-volatile memory and stores a boot program and the like of the MFP 101. The HDD 204 is a hard disk with a larger capacity compared to the RAM 203. A control program of the MFP is stored in the HDD 204. An OS (Operating System) and application programs are also stored in the HDD 204.

The CPU 201 executes the boot program stored in the ROM 202 when the MFP 101 is started up. This boot program is for reading out the program of the OS (Operating System) stored in the HDD 204 and expanding the read-out program to the RAM 203. Upon executing the boot program, the CPU 201 subsequently executes the program of the OS expanded on the RAM 203 and performs control of the MFP 101. The CPU 201 also stores data to be used in operations performed by the control program in the RAM 203 and performs reading and writing of the data.

Note that although it is assumed that one CPU 201 executes the processing shown in the later-described flowchart, the MFP 101 may also have another mode. For example, multiple CPUs and microprocessors (MPUs) can also cooperate to execute the processing shown in the later-described flowchart. A portion of the later-described processing may also be executed using a hardware circuit such as an ASIC (Application Specific Integrated Circuit) or an FPGA (Field-Programmable Gate Array).

The operation unit 205 is a display that can be operated by touch, and various later-described user interfaces are displayed on the operation unit 205. A printer 206 is a printer engine for printing print data received from an external device via a communication unit 207. The communication unit 207 is a network interface for connecting to the Internet or a LAN (Local Area Network) of an office.

An IC card reader 208 is an apparatus for reading out information to be used in user authentication from an IC card, and is a unit that is needed for realizing IC card authentication. A camera 209 is a camera unit for capturing an image of the face of the user using the MFP 101. The camera 209 may also be an external camera that can be connected via a USB or a wireless LAN. In addition, a scanner unit is also included, although this is not shown in the drawings.

Software Configuration

FIG. 3 is a simplified diagram showing a software configuration of the MFP 101 and the facial authentication server 102.

Software Configuration of Facial Authentication Server 102

A software configuration of the facial authentication server 102 will be described hereinafter. A REST service 310 is a service that uses REST (REpresentational State Transfer) to accept requests for registration of face data and facial authentication from terminals (including the MFP 101) connected via the Internet. REST may be, for example, an XML-based Web interface that uses HTTP. For example, face data and a user name is received through REST, and the received data is registered in the face data management unit 312 in association with the user name. At this time, a Personal ID is issued as a unique ID for identifying the user, and the terminal that is the request source is notified of the Personal ID. For example, the face data management unit 312 manages face data of multiple users using a facial authentication database, as shown in Table 1. Note that in Table 1, the user names are the names of users to be used in display and the like, the face data need only be in a format supported by the facial authentication server 102, and for example, the face data may be face image data, feature data obtained by extracting feature amounts of a face image, or the like.

TABLE 1

| Personal ID | User name | Face data |
|---|---|---|
| 96df7500-7e82 . . . | Alice | ******** |
| 6fc11e17-faf4 . . . | Carol | ******** |
| 1fb233f6-1f8e . . . | Dave | ******** |

When the REST service receives a facial authentication request together with face data, the facial authentication unit 311 references the data of the registered users shown in Table 1 and calculates candidates and a score for each candidate. The score is a value indicating how high the likelihood that a candidate corresponds to the received face data is, and for example, is indicated by a percentage. The score may also be indicated by the size of a numerical value of a natural number instead of a percentage. The candidate corresponding to the received face data is determined according to the value of the score. For example, a threshold value may be provided, and the registered user corresponding to a score exceeding the threshold value may be determined as the candidate. For this reason, as a result of calculating the score, zero candidates are determined in some cases. Also, multiple candidates are specified for face data of one person in some cases. Also, if the face data of multiple people is included in the received face data, scores are calculated for the respective multiple people, and respective candidates are determined. The ID, user name, and score of a candidate obtained as a result of the calculation are returned to the terminal that is the source of the authentication request via the REST service 310.

This kind of cloud service is generally called a cognitive service, and examples of services that provide a facial authentication function include FaceAPI of Microsoft, Inc. (trademark). For example, FaceAPI provides a REST service that accepts requests such as those shown in Table 2.

TABLE 2

| Request type | Function | Input data | Output data |
|---|---|---|---|
| Create | Register user information | User name, etc. | Personal ID Identification ID of registered user |
| Add Face | Designate Personal ID and register face image | Face image | Face ID Identification ID of registered face image |

TABLE 2-continued

| Request type | Function | Input data | Output data |
|---|---|---|---|
| Detect | Detect face in image | Image | Face ID Identification ID of detected face image |
| Identify | Designate Face ID and acquire facial authentication result | Face ID | Personal ID of candidate and score |
| Get | Designate Personal ID and acquire user name, etc. | Personal ID | User name, etc. |

The MFP 101 can provide the user with a facial authentication login function by cooperating with a cognitive service such as that described above.

Software Configuration of MFP 101

Figures 1, 4A:
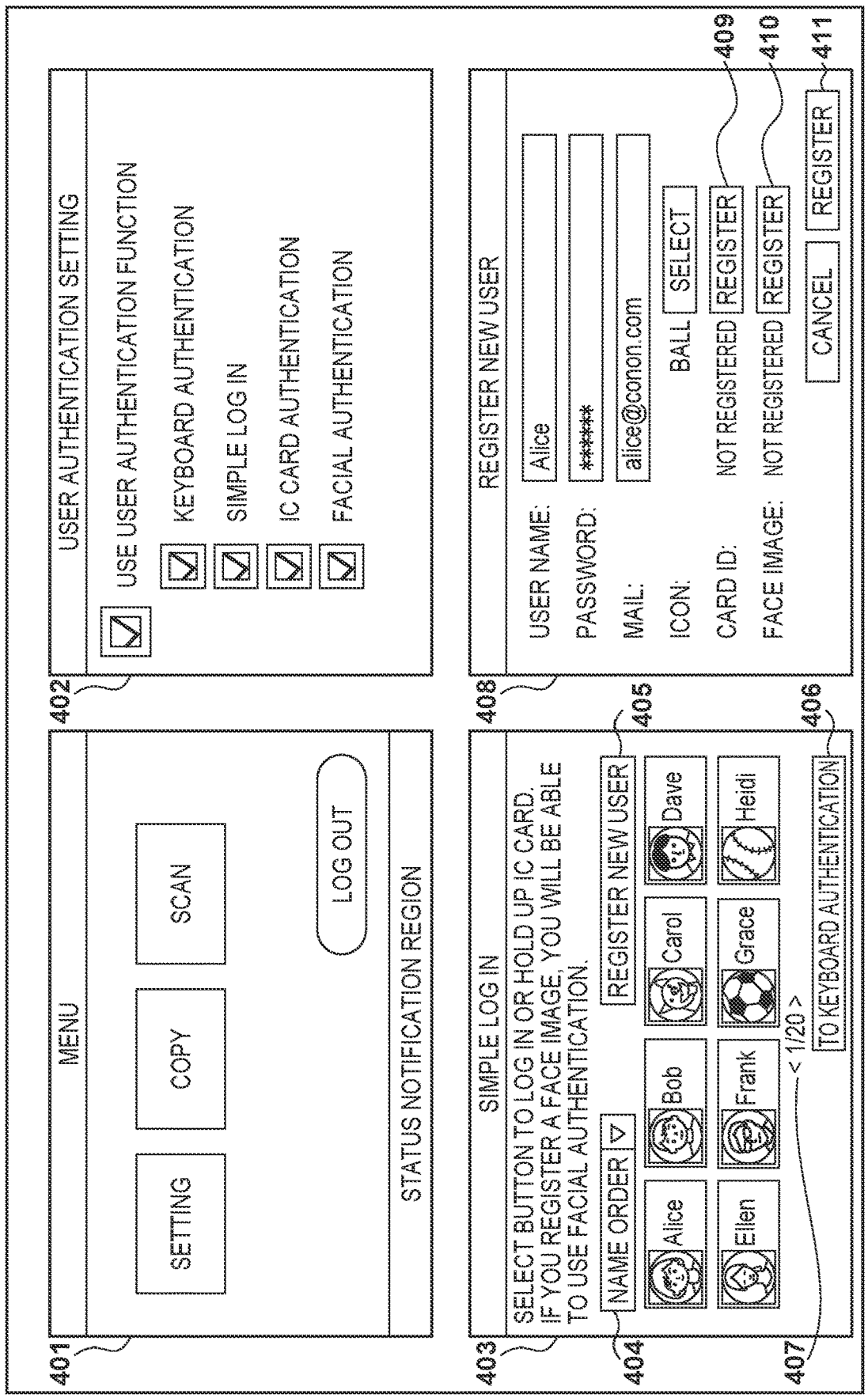
Figures 2, 4A:
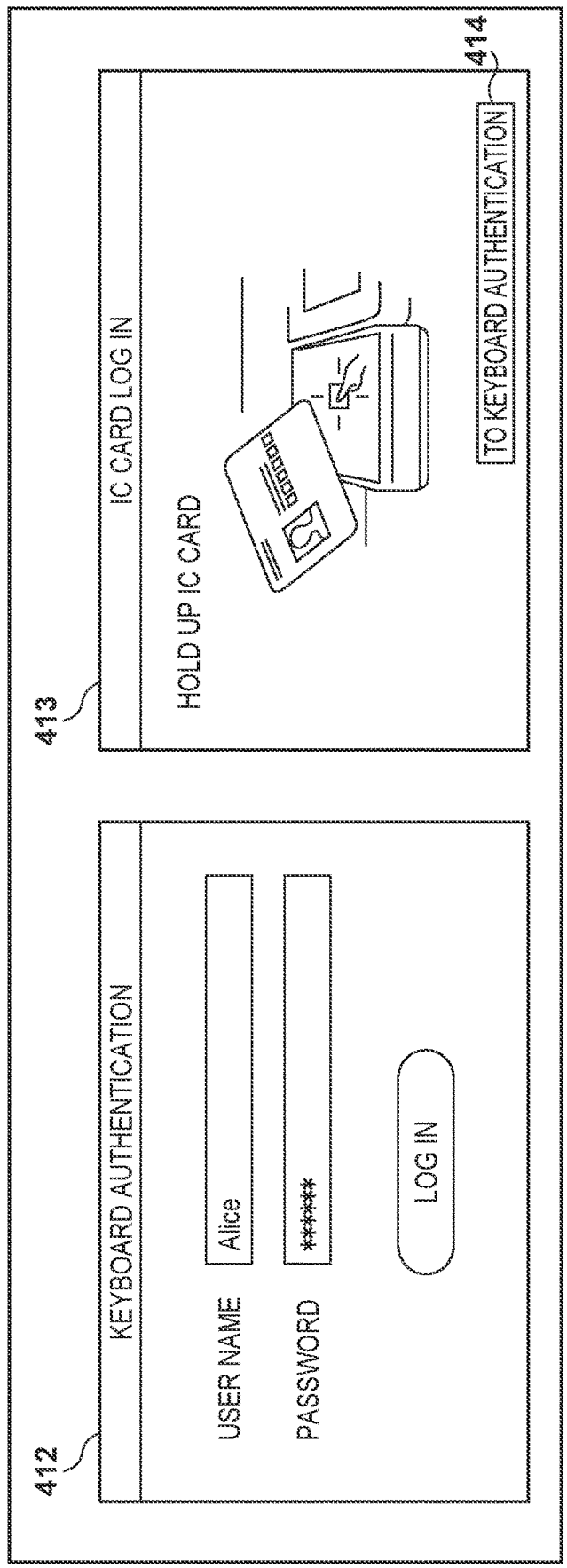

A software configuration of the MFP 101 will be described hereinafter. A local UI 301 of the MFP 101 provides a user interface by which a user uses setting changes and functions of the MFP 101, via a display of the operation unit 205. An example of the user interface provided by the local UI 301 is shown in FIGS. 4A and 4B. A remote UI 302 has an HTTP (Hypertext Transfer Protocol) server function, and provides the user with a user interface configured using HTML (HyperText Markup Language). The user can access the remote UI 302 using a web browser in a user terminal, and change settings and use functions of the MFP 101. The provided user interface screen may be similar to the local UI. A login service 303 is a software module that authenticates a user using the local UI 301 or the remote UI 302 and allows the user to log in to the MFP 101. The login service 303 can register an account of a manager or a general user in the HDD 204 via the user interface of the local UI 301 or the remote UI 302. Table 3 below shows an example of an account information database including account information stored in the HDD 204. User names, passwords, card IDs of IC cards, roles (manager/general user), e-mail addresses, and the like can be registered as account information in the HDD 204. Note that a user whose Personal ID is blank indicates that facial authentication registration has not been performed.

TABLE 3

| User name | Password | Card ID | Role | E-mail | Personal ID |
|---|---|---|---|---|---|
| Admin | ***** | ABC123456 | Manager | admin@canon.com | |
| Alice | ***** | ABC123457 | General user | alice@canon.com | 96df7500-7e82 . . . |
| Bob | ***** | ABC123458 | General user | bob@canon.com | |
| Carol | ***** | ABC123459 | General user | carol@canon.com | 6fc11e17-faf4 . . . |
| Dave | ***** | ABC123460 | General user | dave@canon.com | 1fb233f6-1f8e . . . |

In the settings during factory shipment of the MFP 101, the user authentication function is disabled, and when the MFP 101 is started up, the local UI 301 displays a menu screen 401 in FIG. 4A-1 for selecting an application. Note that although the term "user authentication function" is used, a simple login function is a function for specifying and logging in a user without performing user authentication, and therefore it is not exactly a user authentication function. However, it is easier for a user using the MFP 101 to understand when it is displayed as the user authentication function, and therefore in the first embodiment, display is intentionally performed in this manner. The user authentication function that can be selected on the user authentication setting screen 402 can also be called a login function.

The user can display the user authentication setting screen 402 via the menu screen 401. It is possible to select enabling/disabling of the user authentication function on the user authentication setting screen 402. Also, when enabling of the user authentication function is selected, the user can further select one or more login functions from keyboard authentication, simple login, IC card authentication, and facial authentication. The user authentication setting screen 402 shows a state in which the user authentication function has been enabled and all of the login functions have been selected.

When facial authentication is enabled, the threshold value of the score for allowing automatic login to the MFP in facial authentication can be set by being input to a textbox 416 using a facial authentication detail setting screen 415 in FIG. 4B. For example, in the setting of the score, a numerical value between 1 and 100 is set. Instead of allowing the user to input the numerical value, it is also possible to provide the user with options such as large, medium, and small and allow the user to select an option, and it is also possible to set the numerical value using a UI component such as a slide bar. The setting selected by the user is stored in the HDD 204, the login service 303 references the setting, and the login function corresponding to the setting of the user is started up.

When all of the login settings (keyboard authentication, simple login, IC card authentication, facial authentication) have been enabled, the local UI 301 displays a simple login screen 403 in FIG. 4A-1. Note that the user can perform IC card authentication by holding up an IC card to an IC card reader even on the screen of 403, and can perform keyboard authentication by selecting a button 406 and transitioning to a keyboard authentication screen 412 in FIG. 4A-2. That is, if the simple login function has been set as the login function, the local UI 301 displays the simple login screen 403 even if another login function is enabled. Also, in the case where the simple login function has not been set, if only keyboard authentication is enabled, the keyboard authentication screen 412 is displayed, and if only IC card authentication is enabled or IC card authentication and keyboard authentication are enabled, an IC card authentication screen 413 is displayed as shown in FIG. 4A-2. The IC card authentication screen 413 provides a button 414 for displaying the keyboard authentication screen 412.

The login service 303 does not allow only the facial recognition function to be enabled as the login function. If the user has set facial authentication on the user authentication setting screen 402, the local UI 301 performs screen control such that at least one of the other three authentication settings is set. The simple login screen 403 displays a button of a registered user. It is possible to allow the user to log in to the MFP 101 by allowing the user to select their own button on the simple login screen 403. Processing for referencing the user ID of the selected button is performed at this time, and authentication processing for performing verification of so-called authentication information is not performed. That is, the user does not need to perform input of authentication information via an IC card or a keyboard.

If the buttons of the registered users cannot be displayed fully on one screen, the buttons are displayed over multiple pages. A page transition button 407 is a button for a page number currently being displayed and for page transition. The simple login screen 403 includes a button sorting function. A sorting order dropdown 404 is a dropdown for selecting a button sorting order. For example, name order, registration order, last login time order, and the like can be selected.

A new user registration button 405 is a button by which a general user newly registers their account. Upon detecting a press of the new user registration button 405, the local UI 301 displays the user registration screen 408. On the user registration screen 408, input of a user name, password, e-mail address, and the like of user to be newly registered is accepted. Also, the simple login screen 403 provides a function of selecting an icon to be displayed together with the button of the user. Also, if a press of the card ID registration button 409 is detected, the IC card reader 208 is run via a driver 304 of the IC card reader, and a state is entered in which data of an IC card can be read. When an IC card is held up to the IC card reader 208, the card ID is acquired from the IC card.

If a press of the face image registration button 410 is detected, the camera 209 is run via the camera driver 305 and an image of the user in front of the MFP 101 is captured. Furthermore, facial detection processing is carried out on an image acquired using a facial detection library 306, and confirms that a face is present. In general, open-source OpenCV is generally known as a library having functions such as image processing, image analysis, and machine learning, and these open-source libraries may also be used as the facial detection library 306. In the user registration screen 408, registration of the card ID and the face image is not essential, and they need not be registered.

When a press of the registration button 411 is detected, the above-described acquired information is registered in the HDD 204 as the account information (Table 3). If an image including a face image is acquired using the face image registration button 410, a request to register the face data is performed to the REST service of the facial authentication server 102 via a facial authentication server communication unit 307. At this time, the face data is transmitted as needed in a format supported by the facial authentication server 102 (an image file, values obtained by calculating only feature amounts of a face, etc.). The login service 303 receives a Personal ID as a response to the registration request and registers the Personal ID in the HDD 204 as account information (Table 3).

The login service 303 can determine whether or not the user has a registered face image based on whether or not there is a Personal ID in the account information (Table 3). A face image file or information indicating whether or not the face image has been registered may also be stored in association with the account information of the HDD 204. Regarding the registration of the account information, it is also possible to provide a function according to which the account information of multiple users can be registered collectively (provide a UI for the manager of the MFP with the local UI 301 or the remote UI 302). The card ID or the face image to be used when the manager is to perform collective registration may also be data acquired from an apparatus other than the IC card reader 208 and the camera 209 of the MFP 101.

When the login service 303 detects the IC card, the account information stored in the HDD 204 is referenced, and the user who matches the card ID is allowed to log in to the MFP 101. When a press of the button 406 for displaying keyboard authentication is detected, the keyboard authentication screen 412 is displayed, and input of the user name and the password is accepted. The login service 303 references the user name and password input to the keyboard authentication screen 412 and the account information stored in the HDD 204, and allows the matching user to log in to the MFP 101.

The login service 303 stores the information of the logged-in user in an object called a login context and transmits the information to another software module. Table 4 below shows an example of information stored in the login context. The user name, role, e-mail address, and the like of the logged-in user is stored in the login context as shown in Table 4.

TABLE 4

| Item | Value |
| --- | --- |
| Logged-in user name | Alice |
| Role | General user |
| E-mail | alice@canon.com |

If login to the MFP 101 is successful, the local UI 301 closes the login screen such as the simple login screen 403 and causes the screen to transition to the menu screen 401. The menu screen 401 references the above-described login context and specifies the logged-in user, and then provides a menu screen for the logged-in user. The menu screen or screens of various functions (copying or scanning) provides a function that can be personalized according to the preference of the user.

Settings Relating to Login

The login service 303 provides a logout function. After login processing is carried out, a logout button is displayed on the local UI as shown on the menu screen 401, in any of the above-described authentication schemes. Also, at this time, as the logout processing performed through a hard-key operation, logout processing may also be carried out by receiving an event resulting from a press of the ID button set on the MFP 101. In addition, there is a logout event caused by auto-clear processing or auto-sleep processing that can be set using a power setting screen 420 in FIG. 4B.

Auto-clear is a function in which unsaved settings are cleared and a screen that is displayed during startup is mandatorily transitioned to when the user using the MFP 101 has not carried out an operation for a certain amount of time. As described on the power setting screen 420, the auto-clear processing is carried out at a certain interval by setting the auto-clear transition time 421. As the function 422 after auto-clear, it is possible to set whether to transition to sleep or to carry out screen restoration after auto-clear is carried out.

Similarly to auto-clear, auto-sleep is a function of interrupting display on the local UI and transitioning to a power-saving mode when the user has not used the MFP 101 for a certain amount of time. Note that at this time, auto-sleep processing is carried out simultaneously. Similarly to auto-clear, in auto-sleep as well, it is possible to set an auto-sleep transition time 423, and at this time, power control during sleep transition can be carried out in the setting of power-saving 424 during sleep.

Also, if facial authentication is enabled on the user authentication setting screen 402, it is possible to carry out detailed settings relating to logout processing when facial authentication is enabled using the facial authentication detail setting screen 415. Setting of the facial authentication stop time 417 after logging out can be carried out as a setting relating to logout processing when facial authentication is enabled. The present setting is, for example, a function for preventing a phenomenon such as re-logout from occurring due to facial authentication processing when a user has carried out logout resulting from a press of a logout button displayed on the local UI after facial authentication is carried out. Since facial authentication processing is not accepted for a certain amount of time after logout is carried out due to the present setting, the user can stop unintended facial authentication processing.

Also, with the MFP 101 described in the present embodiment, it is possible to carry out a login switch function through second authentication. The setting for causing execution of this function is a login switch processing setting 418 of the facial authentication setting screen 415. If the present setting is enabled, even if a user is logged in, it is possible to carry out startup processing of the camera 209 that is needed for facial authentication processing, and a user other than the logged-in user can log in. Also, at this time, another user having successfully logged in through facial authentication, facial authentication processing having been successfully performed using a second authentication scheme other than facial authentication, and a login context shown in Table 4 generated through the authentication processing matching are conditions for allowing login. Note that in the present embodiment, a pattern that uses IC card authentication for performing authentication by reading account data recorded on a medium such as an IC card is described as a second authentication scheme, but another authentication scheme may also be used, as long as it is an authentication scheme other than facial authentication.

Examples of the other authentication scheme include a scheme (keyboard authentication) based on account information including secret information such as a password input by the user, and a simple login scheme based on account information that does not include secret information.

Also, in logged-in user switch processing performed through the second authentication scheme, a setting for performing pop-up display to a logged-in user is provided. This setting is a pop-up display setting 419 performed during switching processing on the facial authentication setting screen 415. If this setting is enabled, the pop-up screen 425 is displayed during logged-in user switch processing. The logged-in user is notified of a user switch by displaying this screen, and when approval, that is, "Yes" is selected, it is possible to switch to another user. When rejection, that is, "No" is selected, switching of the logged-in user is not performed, the logged-in user remains logged in, and the login context of the new user may be discarded.

User Switch Processing

Next, logged-in user switch processing of the present embodiment will be described. Also, this is a processing operation flow in which a second user (also referred to as another user) undergoes facial authentication, and interruption and user switching are performed in a state in which a first user is logged in. The present invention is not applied to a case in which a second user performs login using only authentication other than facial authentication, such as keyboard authentication, simple login, or IC card authentication, which can be selected on the user authentication setting screen 402. In the present embodiment, as illustrated in the user authentication setting screen 402, it is assumed that all of the authentication functions are used, but IC card authentication is employed as the second authentication scheme performed after facial authentication.

Operation Flow for Switching Logged-in User

Figure 5:
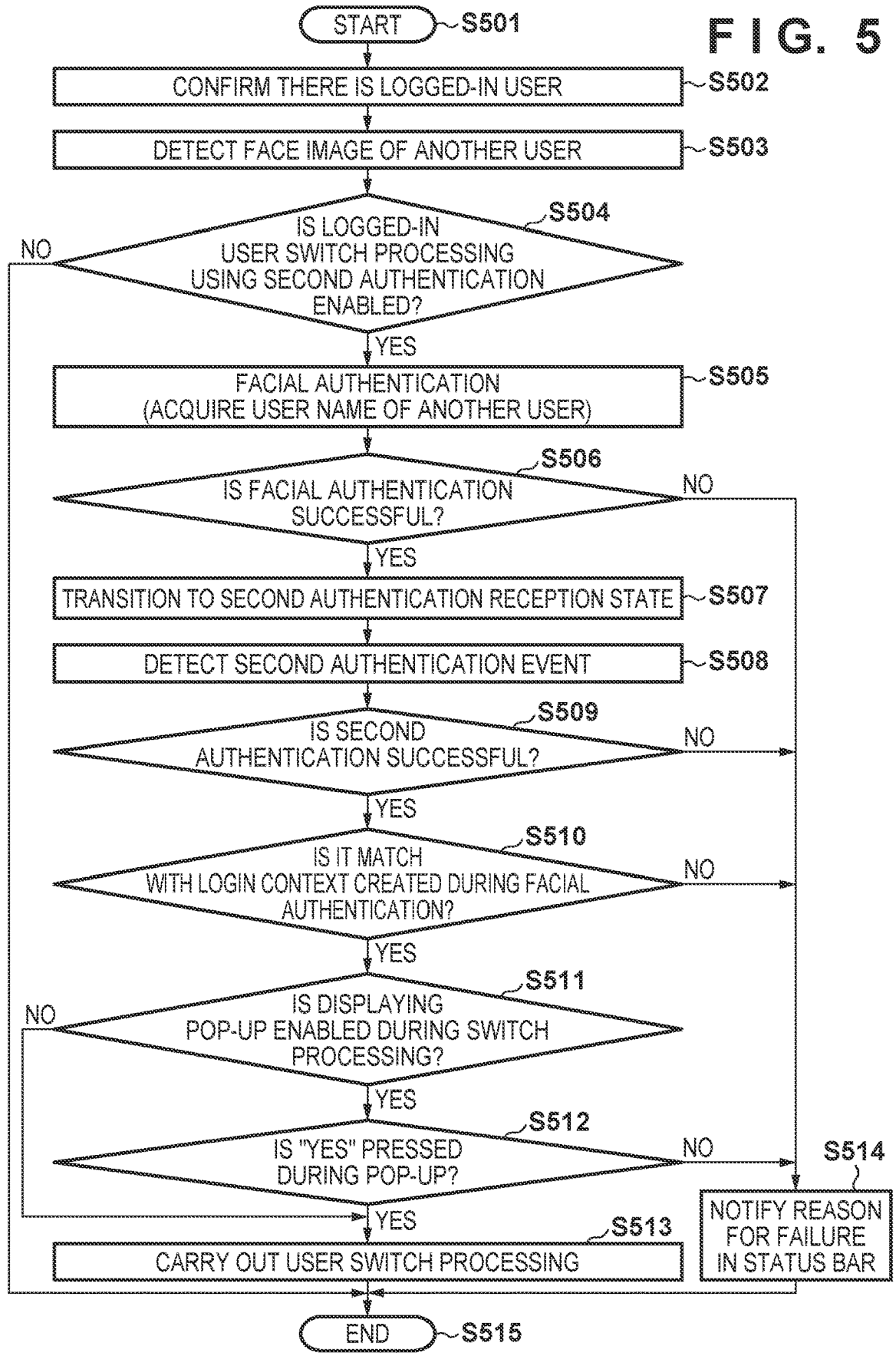
FIG. 5 is a flowchart showing user switching processing achieved through interrupt login.

Operations performed when carrying out user switch processing will be described with reference to the flowchart in FIG. 5. The processing of FIG. 5 is executed by the CPU 201. Also, from the viewpoint of the software module, the processing is executed through the login service 303.

The login service 303 confirms that there is a first user who is logged in (logged-in user) (step S502). It is possible to determine whether or not there is a logged-in user by referencing the login context. If there is no logged-in user, the processing of FIG. 5 ends at this time, and normal login processing is transitioned to (not shown). In the present embodiment, the normal login processing is one-step authentication and does not require second authentication, and the authentication scheme also does not need to be facial authentication. On the other hand, if there is already a logged-in user, the face of a second user different from the current logged-in user is detected from an image shot using a camera 209 (step S503). If the face has been detected, the setting of the logged-in user switch processing 418 set on the facial authentical detail setting screen 415 is confirmed (step S504). If it is determined as a result of the confirmation that the logged-in user switch processing 418 performed using the second authentication scheme is enabled, facial authentication is carried out on the other user (step S505). The facial authentication is performed by transmitting an authentication request together with a face image or face data including features extracted from the face image to the facial authentication server 102. On the other hand, if it is determined that the logged-in user switch processing 418 is disabled, the processing is ended (step S515).

After facial authentication, it is determined whether or not facial authentication was successful (step S506), and if facial authentication performed by the other user was successful, the login service 303 creates the login context of the other user as shown in Table 4, and transitions to a second authentication event reception state (step S507). In the second authentication event reception state, an event for receiving authentication in the second authentication scheme (or the 2nd authentication scheme) is waited for. Here, if one of the following conditions (1) to (3) is satisfied, the second authentication event reception state is canceled.

(1) When second authentication by another user is successful
(2) When second authentication by another user fails
(3) When a logout event is received On the other hand, in step S506, if facial authentication performed by the other user fails, as shown in step S514, error display indicating that facial authentication has failed and the reason therefor is performed in a status notification region shown in the menu screen 401. An error statement displayed in the notification region envisions the error sequences shown below.

(1) A case in which the user does not have a registered face image
(2) A case in which a registered user does not satisfy the set regulation of the automatic login score
(3) A case in which there is an error accessing the facial authentication server 102

If the second authentication event performed by the other user is detected after transitioning to the second authentication event reception state (step S508), the second authentication processing is started. The second authentication processing is user authentication processing according to the second authentication scheme, which is different from facial authentication. When second authentication processing is performed, it is determined whether or not the second authentication was successful (step S509). When the second authentication is successful, the login service 303 creates the login context of the other user shown in Table 4. This is processing for determining whether or not the facial authentication user and the second authentication processing user are the same.

Next, it is determined whether or not the login context created when the facial authentication is successful and the login context created when the second authentication is successful match (step S510). If both match, step S511 is transitioned to. If they do not match, the user switch processing is interrupted due to the reason that the user authenticated through facial authentication and the user authentication through second authentication are not the same user, and display is performed together with the reason for failure in the status notification region.

If it is determined as a result of the two created login contexts being compared that the authenticated users are not the same user, it is determined whether or not the setting 419 for displaying a pop-up during user switch processing is enabled (S511). If it is determined that it is enabled, the pop-up screen 425 of FIG. 4B is displayed. If it is determined that it is enabled, display of the pop-up screen 425 is not carried out and user switch processing is carried out (step S513). During pop-up display, it is determined whether or not a "Yes" button displayed on the screen has been touched (step S512), and if it has been touched, the user switch processing is carried out (step S513). If a press of a "No" button has been detected, the user switch processing is not carried out, the failure reason for why user switching was rejected is displayed on the status bar, and processing is ended.

In user switch processing of step S523, for example, the login context of the first user who is already logged in is erased, and the first user is mandatorily logged out, and the login context of the second user who has interrupted is stored as the login context of the logged-in user. Note that if the first user is performing some kind of processing, the users may also be switched after waiting for the completion of the processing. However, in the present embodiment, when the interrupting second user is to log out, the information of the interrupted first user is used in some cases. In view of this, the user ID of the first user is stored as the user ID of the user interrupted by the logged-in user.

Through the above-described procedure, while a certain user is logged in, the user is logged in if the other user succeeds at facial authentication and authentication using a second authentication scheme different from the facial authentication. Accordingly, the other user interrupts and logs in without waiting for the logged-in user to log out, or without waiting for elapse of a predetermined amount of time after the logged-in user logs out.

Note that the logged-in user interrupted by the other user is mandatorily logged out through the above-described procedure, but the logged-in state may also be temporarily removed after the context is stored such that the logged-in user interrupted by the other user can return as a logged-in user.

Note that in the latter case, after the interrupting user logs out, the interrupted user may be allowed to return to the logged-in state. Also, in the latter state, it is also possible for the user to interrupt in a nested form, and therefore in the state in which the user has logged in through interruption, interruption performed by the next user may also be denied until either the interrupted user or the interrupting user logs out.

Furthermore, it is also possible that the facial authentication performed in step S505 is performed on a registered user who happens to be nearby. In view of this, when the second authentication event of step S508 is waited for, the timer may be set to a predetermined amount of time, and it is possible to determine that the second authentication has failed if the predetermined amount of time has passed without the second authentication event occurring.

Logout Operation Flow after User Switch Processing

Operations performed when a logout event is detected after the user switch processing is carried out will be described with reference to the flowchart of FIG. 6. The logout event is an event that occurs due to, for example, a logout operation performed by a user, the elapse of an auto-clear or auto-sleep transition time, or the like.

Upon detecting a logout event after the user switch processing is carried out, the login service 303 executes logout processing (step S602) and checks the user authentication setting 402 (step S603). In the logout setting, for example, the current login context is erased. In step S603, it is determined whether or not facial authentication, IC card authentication, and simple login authentication are enabled. The present flow is a flow for narrowing down user icon button display in simple login, and therefore if none of the above authentication settings have been enabled, similarly to the processing of the normal facial authentication logout, the elapse of a predetermined facial authentication stop time from the logout even is waited for (step S606), and after the elapse, a default simple login screen in a facial authentication reception state is displayed (step S607), and the processing is ended (step S612). If all of the authentication settings are enabled, the login service 303 determines the type of the logout event (step S604).

If the logout event was the press of a soft key or a hard key corresponding to a user operation, the user who has not undergone user switch processing may once again use the multifunction printer. For this reason, during the facial authentication stop time after logout, only the user icon of the user who has not undergone the logged-in user switch processing is displayed on the simple login screen (step S605). The user ID of the logged-in user who has not undergone the logged-in user switch processing is stored in step S513 of FIG. 5 in the present example. In this state, step S606 is transitioned to, and the elapse of the predetermined facial authentication stop time is waited for. Until the predetermined facial authentication stop time has elapsed, the login processing performed through facial authentication cannot be carried out, but login can be performed by pressing the user icon on the displayed simple login screen. After the elapse of the facial authentication stop time, the default simple login screen in the facial authentication reception state is displayed (step S607), and the processing is ended.

On the other hand, if it has been determined that the logout event is not a user operation, the login service 303 determines whether or not the logout event is auto-clear or auto-sleep, that is, whether or not the logout event is non-operation for a certain period (step S608). If it is determined that the logout event is auto-clear or auto-sleep, the facial authentication stop time and the auto-clear transition time or auto-sleep transition time are referenced based on the facial authentication detail setting 415 and the power setting 420. The target of the referencing may be the transition time corresponding to the logout event. For example, if the logout event is auto-clear, the auto-clear transition time need only be referenced, and if it is auto-sleep, the auto-sleep transition time need only be referenced. If the referenced auto-clear transition time or auto-sleep transition time is shorter than the facial authentication stop time (step S608), it is determined that logout performed through clear processing (not shown) has occurred during use by the user, and only the user icon button resulting from user switching being carried out is displayed on the simple login screen (step S609). That is, only the user icon button of the current logged-in user is displayed.

Also, in the case of a logout event performed through auto-clear or auto-sleep, normally there are many cases in which there is no user next to the MFP 101, and therefore the facial authentication stop time is not provided. However, in the case of the present use case, narrowing-down of the icons is performed, in which only the icons of specific users are displayed on the simple login screen. For this reason, the UI display processing in which narrowing-down is performed needs to be returned to default display in which other users can also login. The facial authentication stop time after logout is used as the timing in this case, and the elapse of the time is waited for in step S610. During this time, facial authentication can also be received. When the facial authentication stop time after logout ends, the UI display of the displayed simple login is transitioned to default (step S607).

On the other hand, in step S608, if it is determined that the referenced auto-clear transition time or auto-sleep transition time is longer than the facial recognition stop time, the narrowing-down processing of the simple login icons is not carried out, and default icon display is carried out (step S611). This is because there is a high likelihood that the user has stopped using the MFP 101 and is away from the MFP 101. Thereafter, the processing branches to step S610. Note that in this case, even if the simple login screen is re-displayed in step S607, the content thereof does not change, and therefore step S607 may also be skipped. Also, if it is determined that the logout event is not a user operation in step S604, step S608 may also be skipped, the processing may branch to step S609.

Figure 6:
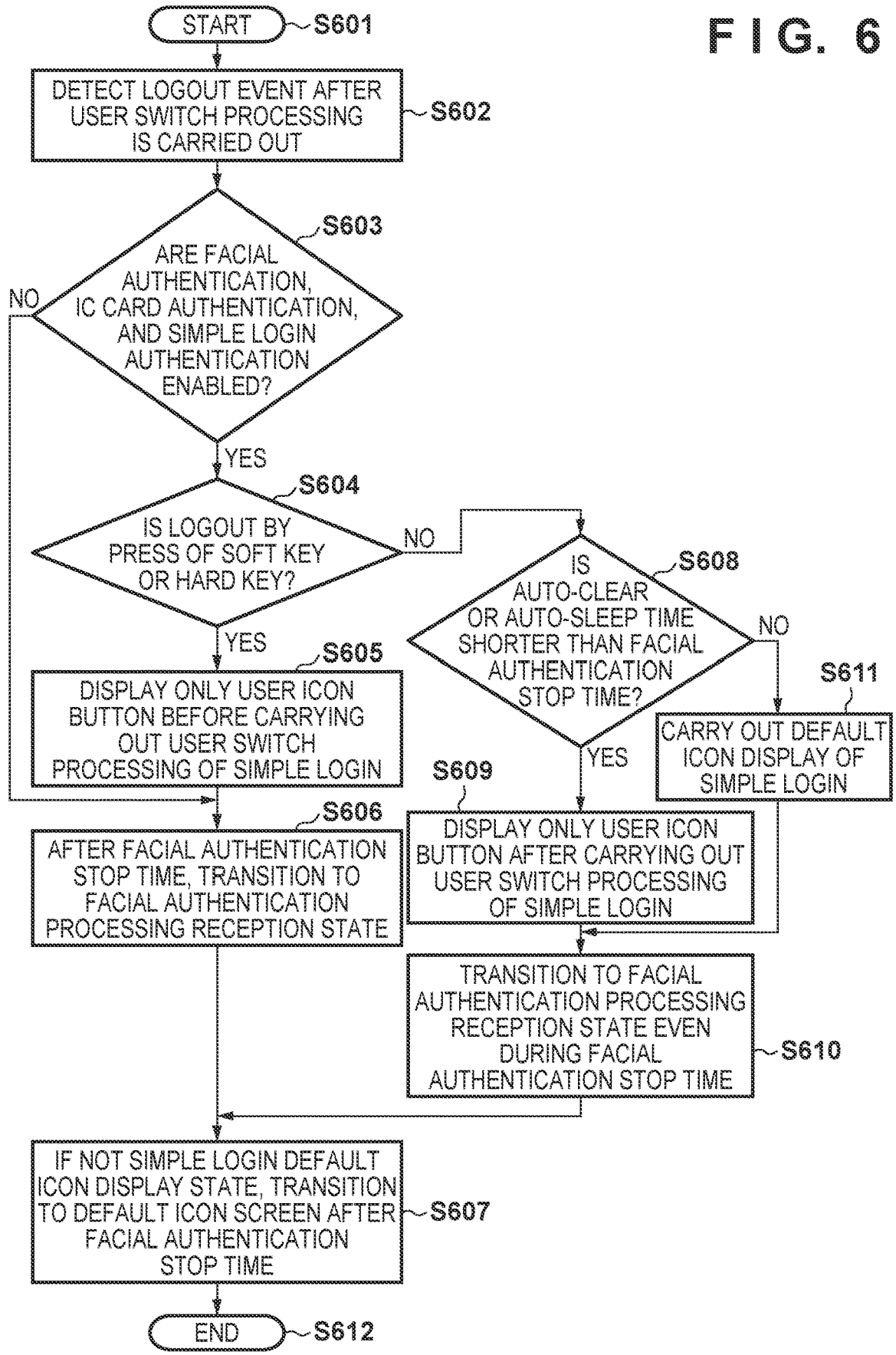
FIG. 6 is a flowchart showing processing performed when an interrupting user logs out.

FIG. 7 shows a simple login screen that is displayed during the procedure of FIG. 6. The simple login screen 701 is a default simple login screen that is displayed in steps S607 and S611. A sorting pull-down 404, an all-button display button 704 for displaying all of the user icons as buttons, and a button 405 for new user registration are included on the screen. Also, a user who attempts to perform a simple login need only touch the user button displaying the icon of that user. On the default simple login screen 701, a user button is displayed for a user whose face image for facial authentication has not been registered. This is because a user whose face image has been registered need only undergo facial authentication.

The simple login screen 702 is the simple login screen displayed in step S605. The user buttons included on the simple login screen 702 are narrowed down to user buttons of users who were logged in through interruption. Also, the simple login screen 703 is the simple login screen displayed in step S609. The user buttons included on the simple login screen 703 are narrowed down to user buttons of users who performed interrupt login. Note that in the present embodiment, a user who performs interrupt login needs to undergo facial authentication, and therefore has a face picture that has been registered for authentication. For this reason, the user button of a user Bob that is included on the simple login screen 703 is not shown on the default simple login screen 701.

As described above, according to the present embodiment, when a first user is logged in, a second user can interrupt and login, and the logged-in user can be switched. For this reason, the first user does not need to wait for logout due to the user moving away from the MFP 101, or for the elapse of a facial authentication stopping time after manual logout. Accordingly, availability of the MFP 101 increases, and productivity can be increased.

Furthermore, in order to perform interrupt login, the user needs to undergo facial authentication as well as authentication through a second authentication scheme that is not facial authentication, and thus accidental interrupt login can be prevented.

After the interrupting second user has logged out, a screen corresponding to the logout event is displayed as the login screen of the next user. Accordingly, login of a user after logout of a second user can be performed smoothly. Specifically, as long as the logout event is a logout operation, it is possible for the interrupted first user to login again, and therefore accidental login of the second user is prevented by providing a facial authentication stop period. Displaying the login screen that has been narrowed down to the user button of the first user makes it easier for the first user to login.

Also, if there has been no operation for a logout event over a predetermined amount of time and the amount of time for which there has been no operation is shorter than the facial authentication stop time, the interrupting second user can login once again. In view of this, the login screen narrowed down to the user button of the second user is displayed without providing a facial authentication stop period. Doing so makes it easier for the second user to login.

Also, if the logout event is that there has been no operation over a predetermined amount of time and the amount of time for which there was no operation is greater than or equal to the facial recognition stop time, it is thought that the interrupting second user has stopped using the MFP and moved away from its location. In view of this, the default login screen is displayed such that no facial authentication stop period is provided and a user who cannot use facial authentication is given an opportunity to perform a simple login. Doing so makes it easier for all users to login.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-163844, filed Sep. 9, 2019 which is hereby incorporated by reference herein in its entirety.

What is claimed is:

1. An information processing apparatus comprising:
at least one processor; and at least one memory, wherein the memory stores a program, and when the processor executes the program, the processor performs operations comprising
performing facial authentication of a second user in a state in which a first user is logged in,
performing authentication of the second user using a second scheme that is different from facial authentication if the facial authentication is successful, and
switching a logged-in user from the first user to the second user if the authentication using the second scheme is successful and the authenticated user is the second user and wherein if a setting for performing switching of the logged-in user is not enabled, facial authentication of the second user is not performed in a state in which the first user is logged in.

2. The information processing apparatus according to claim 1, wherein in the switching, if the user authenticated through the second scheme is the second user, a confirmation operation performed by the second user is received, and the logged-in user is switched from the first user to the second user in response to the confirmation operation.

3. The information processing apparatus according to claim 1, wherein in the switching of the logged-in user, the second user is logged out in response to a logout event that occurs in a state in which the second user is logged in, and a login screen corresponding to a type of the logout event is displayed.

4. The information processing apparatus according to claim 3, wherein if the type of the logout event that occurs in the state in which the second user is logged in is a user operation, a login screen in which a target user has been narrowed down to the first user is displayed on the login screen and the facial authentication is stopped over a predetermined amount of time.

5. The information processing apparatus according to claim 3, wherein if the type of the logout event that occurs in the state in which the second user is logged in is non-operation exceeding a certain amount of time, a login screen in which a target user has been narrowed down to the second user is displayed on the login screen and the facial authentication is not stopped.

6. The information processing apparatus according to claim 4, wherein upon elapse of a predetermined amount of time during which the facial authentication is stopped after the login screen is displayed, the login screen is changed to a login screen in which a target user has been narrowed down to a user whose face data for the facial authentication has not been registered.

7. The information processing apparatus according to claim 3, wherein the first user is logged out in response to a logout event that occurs in a state in which the first user is logged in, and the facial authentication is stopped over a predetermined amount of time, and in a case where the type of the logout event that occurs in a state in which the second user is logged in is non-operation exceeding a certain period, if the certain period is shorter than the predetermined amount of time, a login screen in which a target user has been narrowed down to a user whose face data for the facial authentication has not been registered is displayed on the login screen, and the facial authentication is not stopped.

8. The information processing apparatus according to claim 3, wherein an icon of a target user is included on the login screen.

9. The information processing apparatus according to claim 8, wherein the icon includes a face image of a user.

10. A non-transitory computer-readable medium storing a program, the program causing a computer
to perform facial authentication of a second user in a state in which a first user is logged in,
perform authentication of the second user using a second scheme different from facial authentication if the facial authentication is successful, and
switch a logged-in user from the first user to the second user if the authentication through the second scheme is successful and the authenticated user is the second user and wherein if a setting for performing switching of the logged-in user is not enabled, facial authentication of the second user is not performed in a state in which the first user is logged in.

11. A method for controlling an information processing apparatus, the method comprising:
performing facial authentication of a second user in a state in which a first user is logged in;
performing authentication of the second user using a second scheme different from facial authentication if the facial authentication is successful; and
switching a logged-in user from the first user to the second user if the authentication through the second scheme is successful and the authenticated user is the second user and wherein if a setting for performing switching of the logged-in user is not enabled, facial authentication of the second user is not performed in a state in which the first user is logged in.

* * * * *